(12) United States Patent
Cho et al.

(10) Patent No.: US 9,698,452 B2
(45) Date of Patent: Jul. 4, 2017

(54) BATTERY PACK

(71) Applicant: SAMSUNG SDI CO., LTD., Yongin-si, Gyeonggi-do (KR)

(72) Inventors: Man-Sik Cho, Yongin-si (KR); Kum-Yul Hwang, Yongin-si (KR)

(73) Assignee: SAMSUNG SDI CO., LTD., Yongin-Si, Gyeonggi-Do (KR)

(*) Notice: Subject to any disclaimer, the term of this patent is extended or adjusted under 35 U.S.C. 154(b) by 128 days.

(21) Appl. No.: 14/617,440

(22) Filed: Feb. 9, 2015

(65) Prior Publication Data

US 2015/0263393 A1   Sep. 17, 2015

(30) Foreign Application Priority Data

Mar. 13, 2014   (KR) .................. 10-2014-0029506

(51) Int. Cl.
*H01M 10/48* (2006.01)
*H01M 2/10* (2006.01)
*H01M 10/42* (2006.01)

(52) U.S. Cl.
CPC ....... *H01M 10/482* (2013.01); *H01M 2/1077* (2013.01); *H01M 2/1094* (2013.01); *H01M 10/425* (2013.01); *H01M 10/4207* (2013.01); *H01M 2010/4271* (2013.01); *H01M 2220/20* (2013.01)

(58) Field of Classification Search
CPC combination set(s) only.
See application file for complete search history.

(56) References Cited

U.S. PATENT DOCUMENTS

2010/0148008 A1* 6/2010 Hernando Sebastian ............... B64C 3/187 244/131
2012/0323511 A1  12/2012 Saigo et al.

FOREIGN PATENT DOCUMENTS

JP 2013-005509 A2 1/2013
KR 2007-0101496 A 10/2007
KR 2012-0108260 A 10/2012

* cited by examiner

*Primary Examiner* — Kaity Chandler
(74) *Attorney, Agent, or Firm* — Lee & Morse, P.C.

(57) ABSTRACT

A battery pack including a plurality of battery arrays, each battery array including unit batteries that each have a terminal, the plurality of battery arrays being stacked in a first direction; an insulator on at least one side of the battery arrays, terminals of the unit batteries being on the one side; and a sensing bar on the insulator, wherein the insulator includes at least one opening therein, at least one terminal being exposed through the at least one opening, and the sensing bar is electrically connected to the at least one terminal exposed through the at least one opening to sense a state of the battery array.

17 Claims, 7 Drawing Sheets

BATTERY PACK

CROSS-REFERENCE TO RELATED APPLICATION

Korean Patent Application No. 10-2014-0029506, filed on Mar. 13, 2014, in the Korean Intellectual Property Office, and entitled: "Battery Pack," is incorporated by reference herein in its entirety.

BACKGROUND

1. Field

Embodiments relate to a battery pack.

2. Description of the Related Art

A high-power battery pack using a non-aqueous electrolyte with high energy density has recently been developed. The high-power battery pack may be configured as a high-voltage or large-capacity battery pack manufactured by connecting a plurality of unit batteries in parallel or series so as to be used in driving motors of devices requiring high power, e.g., electric vehicles and the like.

SUMMARY

Embodiments are directed to a battery pack.

The embodiments may be realized by providing a battery pack including a plurality of battery arrays, each battery array including unit batteries that each have a terminal, the plurality of battery arrays being stacked in a first direction; an insulator on at least one side of the battery arrays, terminals of the unit batteries being on the one side; and a sensing bar on the insulator, wherein the insulator includes at least one opening therein, at least one terminal being exposed through the at least one opening, and the sensing bar is electrically connected to the at least one terminal exposed through the at least one opening to sense a state of each of the battery arrays.

The sensing bar may extend along the first direction.

The plurality of battery arrays may be arranged so that polarities of terminals are alternately disposed.

The insulator and the sensing bar may be on both sides of each of the battery arrays.

The insulator may include a first insulator on a first side of each of the battery arrays and a second insulator on a second side of each of the battery arrays, the second side being opposite to the first side, and the at least one opening may include a first opening in the first insulator and a second opening in the second insulator.

A first terminal having a first polarity may be exposed through the first opening, and a second terminal having a second polarity that is opposite to the first polarity may be exposed through the second opening.

The battery pack may further include a protective circuit module that is electrically connected to the sensing bar.

The protective circuit module may include a first connector, the sensing bar may include a second connector at an end thereof, the second connecting being coupled with first connector.

The first connector may include a hole or groove, and the second connector may include a projection inserted into the hole or groove of the first connector.

The sensing bar may include a protrusion that is inserted into the at least one opening to contact the at least one terminal.

The unit batteries of each battery array may be arranged along a second direction that is perpendicular to the first direction.

Polarities of the terminals of the unit batteries of each battery array may alternate along the second direction.

The unit batteries may be aligned and may be connected in series to each other.

Each battery array may include a plurality of bundles of unit batteries, the bundles of each battery array being connected to each other in series, and the plurality of bundles may be arranged along a second direction, the second direction being perpendicular to the first direction.

Polarities of the terminals of the unit batteries of the bundles may alternate along the second direction.

The bundles may be aligned and may be connected in series to each other.

The unit batteries of each bundle may be aligned along the first direction.

Adjacent battery arrays may be connected in series to each other to form a plurality of battery modules, and different battery modules of the plurality of battery modules may be connected in parallel to each other.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
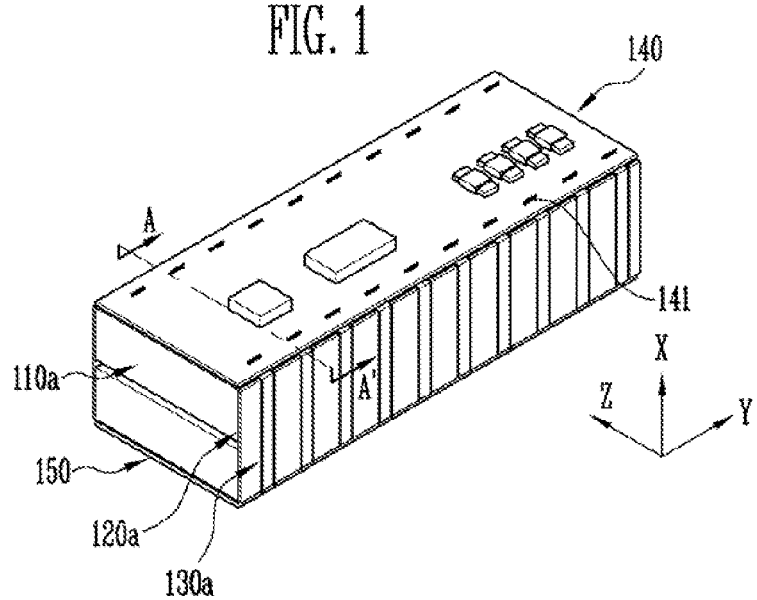
FIG. 1 illustrates a perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

It will be understood that when an element is referred to as being "between" two elements, it can be the only element between the two elements, or one or more intervening elements may also be present.

In addition, when an element is referred to as being "on" another element, it can be directly on the another element or be indirectly on the another element with one or more intervening elements interposed therebetween. Also, when an element is referred to as being "connected to" another element, it can be directly connected to the other element or be indirectly connected to the other element with one or more intervening elements interposed therebetween.

Terms or words used in this specification and claims should not be restrictively interpreted as ordinary meanings or dictionary-based meanings, but should be interpreted as meanings and concepts conforming to the scope of the embodiments on the basis of the principle that one can properly define the concept of a term to describe and explain the embodiments in the best ways.

Figure 2:
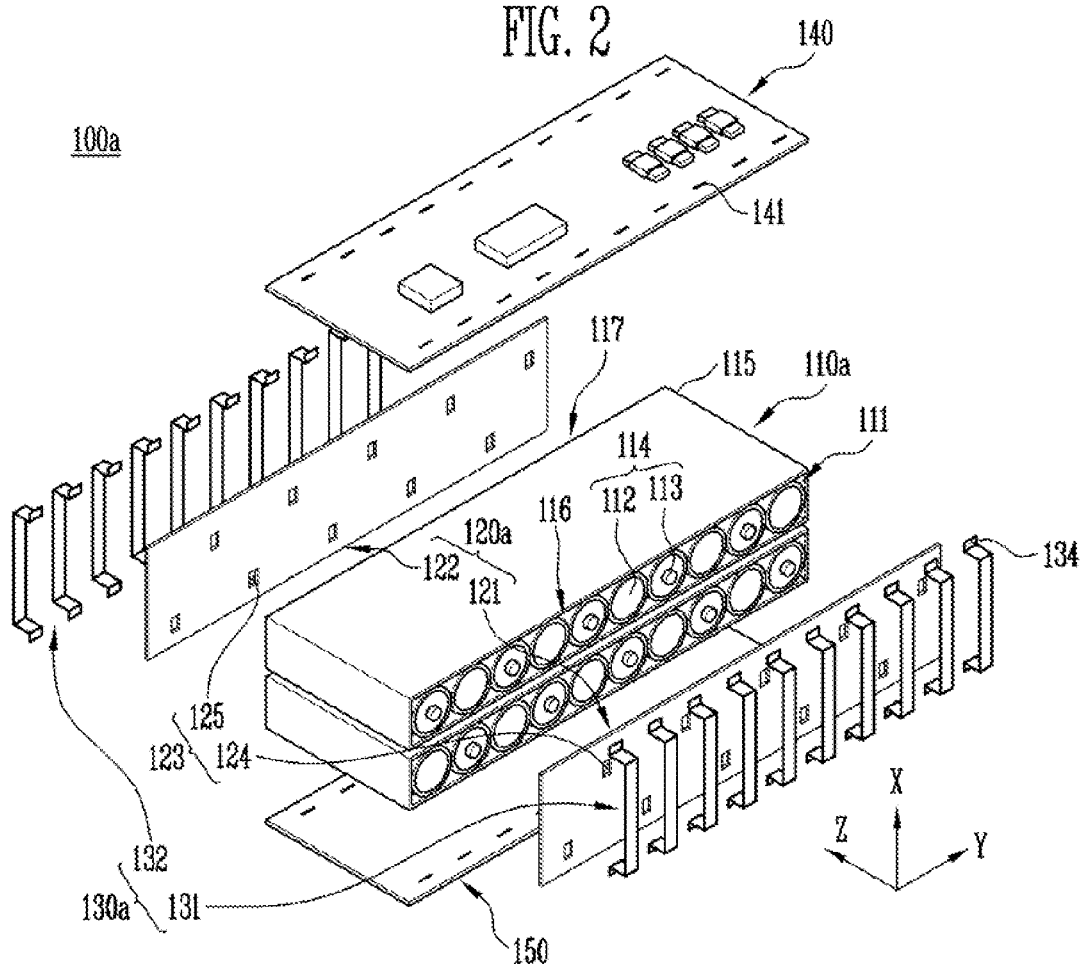
FIG. 2 illustrates an exploded perspective view of the battery pack shown in FIG. 1.
Figure 3:
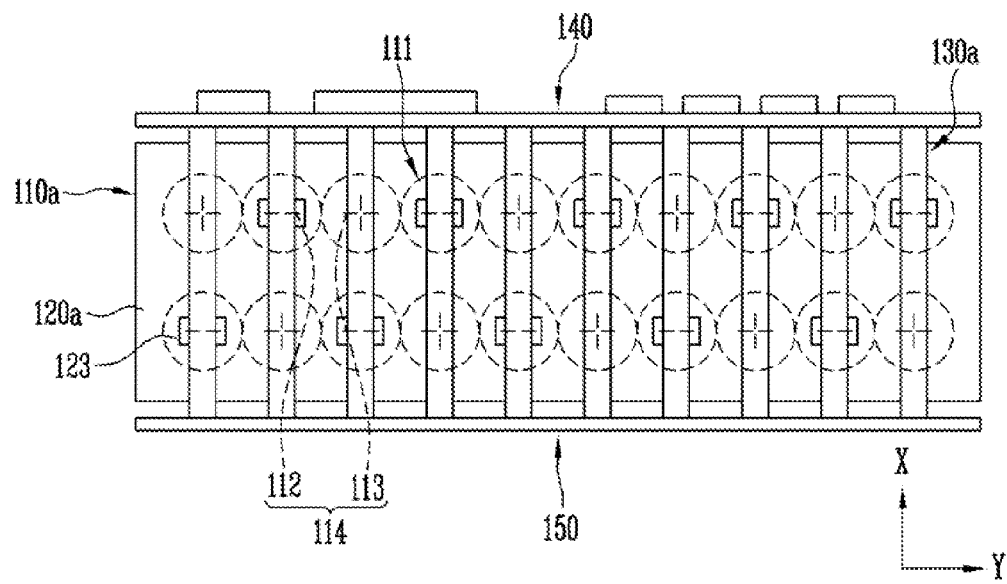
FIG. 3 illustrates a front view of the battery pack shown in FIG. 1.

FIG. 1 illustrates a perspective view of a battery pack 100a according to an embodiment. FIG. 2 illustrates an exploded perspective view of the battery pack 100a shown in FIG. 1. FIG. 3 illustrates a front view of the battery pack 100a shown in FIG. 1. Hereinafter, the battery pack 100a according to this embodiment will be described with reference to FIGS. 1 to 3. For convenience of illustration, it may be described that first, second, and third directions are X, Y, and Z directions, respectively.

As shown in FIGS. 1 to 3, the battery pack 100a according to this embodiment may include a plurality of battery arrays 110a (that are aligned, arranged, or stacked along the first or X direction), an insulator 120a (on at least one surface or side of the battery array 110a), and a sensing bar 130a (on the insulator 120a). The sensing bar 130a may connect between terminals 114 (of unit batteries 111) that are exposed through openings 123 of the insulator 120a, thereby sensing a state of the battery array 110a.

The battery array 110a may include unit batteries 111, each having the terminal 114.

The unit battery 111 may convert chemical energy into electrical energy. The unit battery 111 may include a battery case (of which one side is opened) and an electrode assembly and an electrolyte (accommodated in the battery case). The electrode assembly and the electrolyte may generate electrical energy through an electrochemical reaction therebetween, and the battery case may be sealed with, e.g., a cap assembly. The unit battery 111 may include the terminal 114 including terminals having different polarities, e.g., the terminal 114 may include a first terminal 112 having a first polarity (e.g., positive or negative polarity) and a second terminal 113 having a second polarity (that is the other of the positive or negative polarity, e.g., opposite to the first polarity). In one unit battery 111, the first and second terminals 112 and 113 may be opposite to each other (e.g., on opposite sides of the unit battery 111) along or with respect to the Z direction. For example, the first terminal 112 may be on one surface or side of the unit battery 111, and the second terminal 113 may be on another surface or side of the unit battery 111 that is opposite to the one surface of the unit battery 111. In an implementation, the unit battery 111 may be, e.g., a cylindrical battery. For convenience of illustration, it will be described in this embodiment that the first and second terminals 112 and 113 have negative and positive polarities, respectively. In an implementation, the first and second terminals 112 and 113 may have positive and negative polarities, respectively.

Each battery array 110a may include at least one unit battery 111, and the unit battery 111 may be accommodated in, e.g., a housing 115 of which left and right surfaces or sides are open. For example, the terminals 114 of the unite batteries 111 may face the open sides of the housing 115. In an implementation, when a plurality of unit batteries 111 are included in one battery array 110a, the unit batteries 111 may be aligned or repeatedly arranged along the second or Y direction (e.g., perpendicular to the X direction in which the battery arrays 110a are aligned or stacked). The unit batteries 111 may be aligned or arranged in the Y direction so that the polarities of the terminals 114 of the aligned unit batteries 111 are alternately disposed. For example, when being viewed from a first surface or side 116 of the battery array 110a, which is a side in a plane orthogonal to the Z direction, first and second terminals 112 and 113 of adjacent unit batteries 111 may be alternately viewed, as shown in FIG. 3. In this case, the first and second terminals 112 and 113 of adjacent unit batteries 111 may be connected in series through, e.g., a connection tab, wire, or the like. In an implementation, a plurality of unit batteries 111 may be included in one battery array 110a. For example, the first and second terminals 112, 113 of unit batteries 111 in a battery array 110a may alternate along the Y direction.

The battery pack according to an embodiment may include a plurality of battery arrays 110a, e.g., may include two battery arrays 110a as shown in FIGS. 1 to 3. For example, the battery arrays 110a may be aligned or stacked in the X direction, perpendicular to the Y direction in which the unit batteries 111 in the battery array 110a are aligned or arranged. The battery arrays 110a may be aligned so that the terminals 114 of the unit batteries 111 in each battery array 110a are alternately disposed. For example, as shown in FIG. 3, the polarities of terminals 114 of two unit batteries 111 in the same column and in different battery arrays 110a may be different from each other. In an implementation, the battery arrays 110a may be aligned so that all the terminals having the same polarity face the same direction. In an implementation, the battery arrays 110a may be aligned or arranged so that only the polarities of some aligned terminals 114 are opposite to each other.

The insulator 120a may be on at least one surface or side of the battery array 110a, e.g., on or at which the terminals 114 are positioned.

In an implementation, the insulator 120a may be on one side or both sides of the battery array 110a. For example, the insulator 120a may be on opposite parallel sides of the battery array 110a. The insulator 120a may be arranged such that a plane of the insulator 120a is normal or orthogonal to the Z direction. For example, a plane of the insulator 120a may be defined by the X and Y directions. When the insulator 120a is on both, e.g., opposing, sides of the battery array 110a, the insulator 120a may include a first insulator 121 on the first side 116 of the battery array 110a, and a second insulator 122 on a second side 117 (opposite to the first side 116) of the battery array 110a.

The opening 123 aligned with, corresponding to, or exposing at least one terminal 114 therethrough may be formed in the insulator 120a. The opening 123 may include a first opening 124 in the first insulator 121 and a second opening 125 in the second insulator 122. For example, as shown in FIGS. 1 and 2, a width of the opening 123 may be about equal to or smaller than a width of the sensing bar 130a. In an implementation, as shown in FIG. 3, the width of the opening 123 may be greater than that of the sensing bar 130a.

Figure 4:
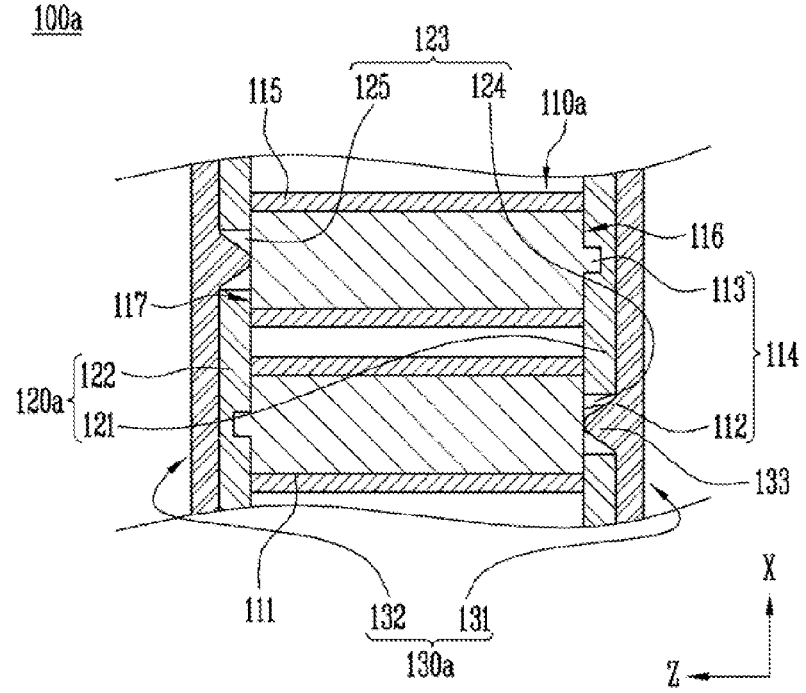
FIG. 4 illustrates a sectional view of the battery pack shown in FIG. 1 taken along line A-A'.

FIG. 4 illustrates a sectional view of the battery pack 100a shown in FIG. 1 taken along line A-A'. Hereinafter, the sensing bar 130a of the battery pack 100a according to the present embodiment will be described with reference to FIGS. 1 to 4.

The sensing bar 130a may be on the insulator 120a and may be electrically connected to one of the terminals 114 exposed through one of the openings 123, thereby sensing a state of the battery array 110a.

In an implementation, the sensing bar 130a may have a rod shape that extends lengthwise along the X direction (e.g., the direction in which the plurality of battery arrays 110a are aligned or stacked). When the insulator 120a is on both, e.g., opposing, sides of the battery array 110a, and/or when a plurality of unit batteries 111 are included in one battery array 110a, the sensing bar 130a may include a plurality of sensing bars. For example, when the insulator 120a is on both sides of the battery array 110a, the sensing bar 130a may include a first sensing bar 131 (on the first insulator 121) and a second sensing bar 132 (on the second insulator 122). When the unit batteries 111 of one battery array 110a or of adjacent battery arrays 110a are formed or arranged in a plurality of columns, the sensing bar 130a may include a plurality of sensing bars to be respectively connected to the terminals 114 (also arranged in columns). In an implementation, one sensing bar 130a may be electrically connected to terminals 114 having the same polarity. For example, one sensing bar 130a may be connected only to terminals 114 having the same (e.g., positive) polarity and that are in different battery arrays 110a (for example, it is shown in FIGS. 1 to 4 that the sensing bar 130a is connected to only the first terminal 112). If one sensing bar 130a were to be connected to both the first and second terminals 112 and 113 of two different unit batteries 111 in the same column (e.g., of different battery arrays 110a), a short circuit could occur, and the state of the battery array 110a may not be sensed.

Contact between the sensing bar 130a (outside of the insulator 120a) and the terminal 114 (inside of the insulator 120a) could be difficult due to a thickness of the insulator 120a. Accordingly, the sensing bar 130a may include at least one protrusion 133. The protrusion 133 may protrude toward the terminal 114 from a main body of the sensing bar 130a so that at least one portion of the protrusion 133 is inside the opening 123 and contacts the terminal 114.

In an implementation, the sensing bar 130a may be electrically connected to the terminal 114 of the unit battery 111 by contacting the terminal 114, and the sensing bar 130a may sense a state of the battery array 110a, e.g., a voltage or state of charge (SOC). Accordingly, it is possible to help improve the safety of the battery pack 100a by using the information sensed or determined by the sensing bar 130a to appropriately control the battery pack 100a.

A protective circuit module 140 may be included on a side of the battery pack 100a adjacent the first and/or second sides 116 and 117. For example, the protective circuit module 140 may be on a top and/or bottom side of the battery pack 100a. The protective circuit module 140 may be electrically connected an end of the sensing bar 130a. In an implementation, a first connector 141 including, e.g., a hole or groove, may be formed in the protective circuit module 140. A second connector 134 including, e.g., a projection bent from the main body of the sensing bar 130a, may be provided at an end of the sensing bar 130a. For example, the second connector 134 may be inserted into the first connector 141, so that the protective circuit module 140 and the sensing bar 130a may be physically and/or electrically connected to each other. The protective circuit module 140 may perform, e.g., an operation of regulating the voltage or SOC balancing of the battery array 110a by checking a state of the battery array 110a that is sensed by the sensing bar 130a. The protective circuit module 140 may be positioned on both opposite side surfaces adjacent to the first and second sides 116 and 117 of the battery array 110a (e.g., at top and bottom sides of the battery arrays 110a or battery pack 100a), or may be positioned on only one side. When the protective circuit module 140 is on only one side (e.g., on the top side of the battery pack 100a), a fixing member 150 may be on the other side opposite to the one side (e.g., on the bottom side of the battery pack 100a), and a connector corresponding to or analogous to the first connector 141 of the protective circuit module 140 may be formed in the fixing member 150 to be coupled to a second connector at another end of the sensing bar 130a (e.g., a bottom end of the sensing bar 130a). For example, ends of the sensing bar 130a may be coupled to the protective circuit module 140 and the fixing member 150, respectively, so that the sensing bar 130a may be easily fixed.

In an implementation, the protective circuit module 140 may include a circuit board having a circuit pattern thereon, and electronic components may be mounted on at least one surface of the protective circuit module 140. In an implementation, the electronic components may include, e.g., a field effect transistor (FET), integrated circuit (IC), or the like. The electronic components may perform a function of controlling an electrode assembly in the unit battery 111 or cutting off a circuit when the electrode assembly is abnormally operated. The circuit board of the protective circuit module 140 may include a switching circuit. For example, the switching circuit, together with the electronic components, may help more efficiently control or protect the battery pack 100a. For example, the protective circuit module 140 may help reduce and/or prevent overcharging, overdischarging, overcurrent, short circuit, and reverse voltage of the battery pack 100a, so that it is possible to help prevent the deterioration of explosion, overheat, leakage, and charging/discharging characteristics of the battery pack 100a and to restrain the degradation of electrical performance and abnormal operation. Accordingly, it is possible to reduce and/or eliminate risk factors and to extend the lifetime of the battery pack 100a.

Figure 5:
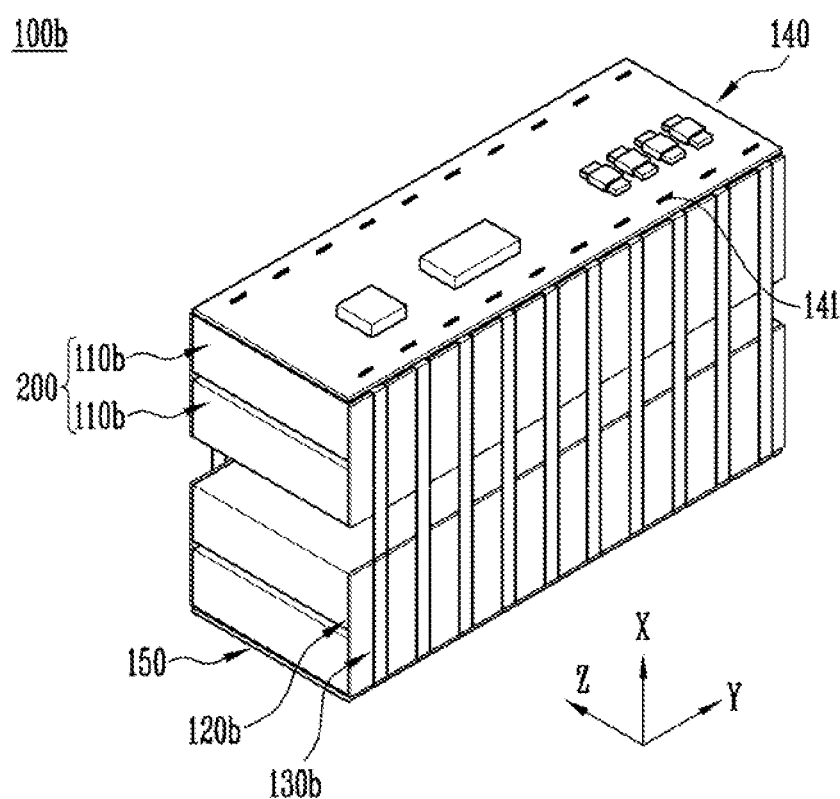
FIG. 5 illustrates a perspective view of a battery pack according to another embodiment.
Figure 6:
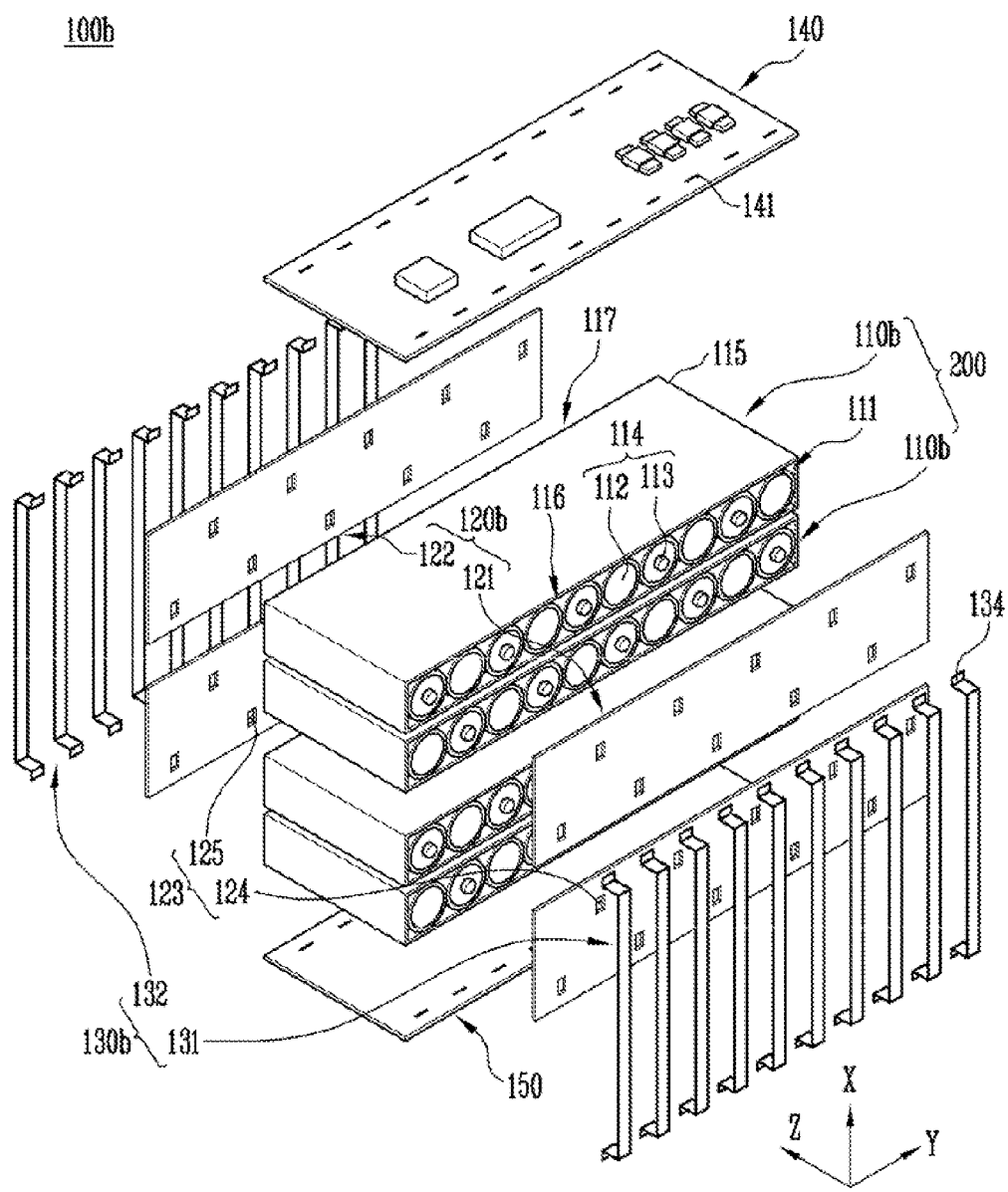
FIG. 6 illustrates an exploded perspective view of the battery pack shown in FIG. 5.
Figure 7:
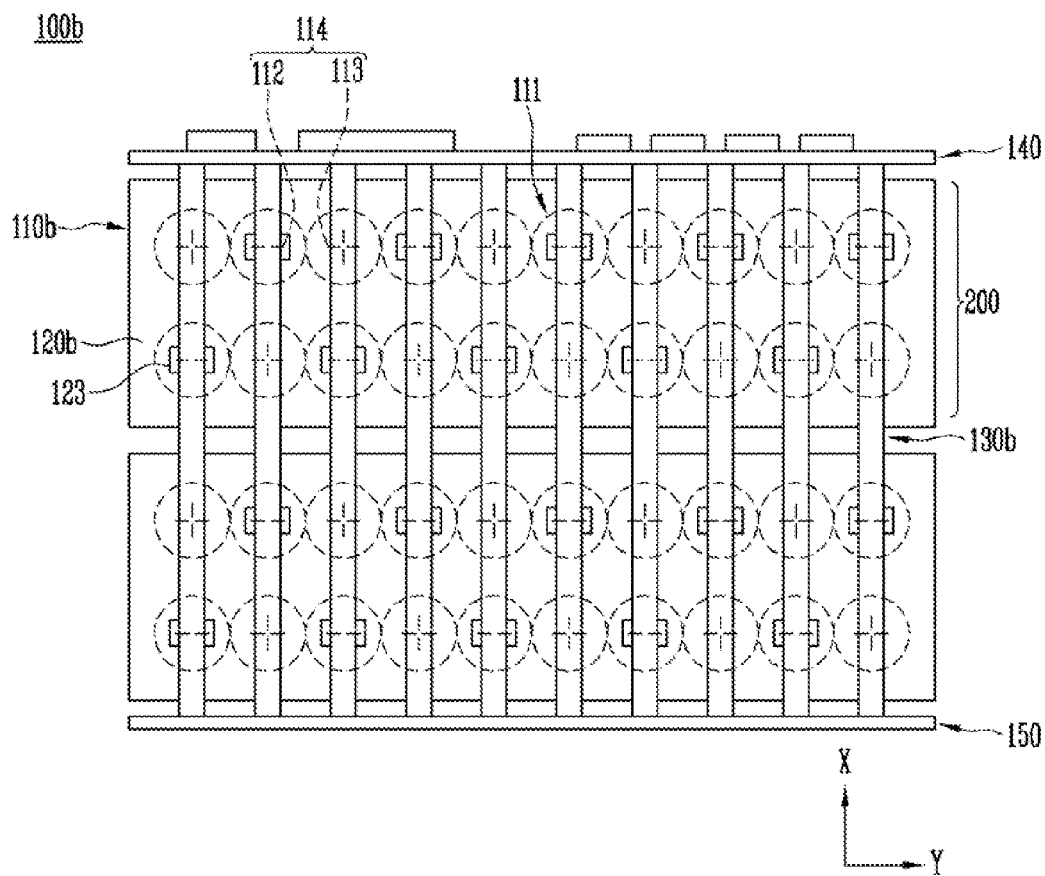
FIG. 7 illustrates a front view of the battery pack shown in FIG. 5.

FIG. 5 illustrates a perspective view of a battery pack 100b according to another embodiment. FIG. 6 illustrates an exploded perspective view of the battery pack 100b shown in FIG. 5. FIG. 7 illustrates a front view of the battery pack 100b shown in FIG. 5. Hereinafter, the battery pack 100b according to this embodiment will be described with reference to FIGS. 5 to 7. Here, components that are identical or corresponding to those of the aforementioned embodiment are designated by like reference numerals, and repeated detailed descriptions thereof may be omitted to avoid redundancy.

As shown in FIGS. 5 to 7, the battery pack 100b according to this embodiment may include a plurality of battery arrays 110b, an insulator 120b, and a sensing bar 130b. At least four battery arrays 110b may be included in the battery pack 100b.

In an implementation, the plurality of battery arrays 110b may be aligned or stacked along the X direction, and battery arrays 110b may be configured so that the polarities of terminals 114 facing the same direction are different along the X direction. For example, as shown in FIGS. 5 to 7, the plurality of battery arrays 110b may be aligned so that the polarities of the terminals 114 of four unit batteries 111 in the same column are alternately disposed. For example, the battery array 110b of a first row may have a terminal 114 (e.g., a first terminal 112) having the same polarity pointing in the same direction as the battery array 110a of a third row, and the battery array 110b of a second row may have a terminal 114 (e.g., a second terminal 113) having the same polarity pointing in the same direction as the battery array 110b of a fourth row. For example, battery arrays 110b of the first and third rows may have terminals of the same polarities pointing in the same direction, but different polarities with respect to terminals of the battery arrays 110b of the second and fourth rows (e.g., in the same column). For example, the polarities of the terminals 114 may alternate in a row direction (Y direction) and column direction (X direction) in the battery pack 100b.

In an implementation, one sensing bar 130b may be connected to the terminals 114 having the same polarity (e.g., in the same column). For example, in FIG. 7, the sensing bar 130b on a first column of unit batteries 111 may be electrically connected to the first terminal 112 of the unit battery 111 of the second row and the first terminal 112 of the unit battery 111 of the fourth row. The sensing bar 130b on a second column of unit batteries 111 may be electrically connected to the first terminal 112 of the unit battery 111 of the first row and the first terminal 112 of the unit battery 111 of the third row. For example, the first openings 124 of the first insulator 121 may expose the first terminals 112 therethrough. For example, the first openings 124 may be arranged in a zigzag or offset form and/or may be aligned with or correspond to some of the terminals 114. The second openings 125 of the second insulator 122 may expose the second terminals 113 therethrough, e.g., the second openings 125 may correspond to or be aligned with the first openings 124.

In an implementation, the battery arrays 110b may be connected in parallel or series. In an implementation, as shown in FIGS. 6 and 7, two adjacent battery arrays 110b may be coupled in series to each other to form a battery module 200, and two battery modules 200 may be then connected to in parallel to each other (e.g., to form the battery pack 100b). For example, in FIGS. 7 to 9, one battery array 110b has a 10S1P structure, and hence it may be seen that one battery module 200 has a 20S1P structure. Thus, it may be seen that that the entire battery pack 100b has a 20S2P structure. For example, the sensing bar 130b may electrically connect between the terminals having the same polarity but that are in different battery modules 200. Accordingly, the voltage or SOC of each bank or module may be measured in a state in which the battery modules 200 are connected in parallel/series. Accordingly, it is possible to help improve the safety of the battery pack 100b, even if the battery pack 100b has a complicated structure of serial/parallel connections.

Figure 8:
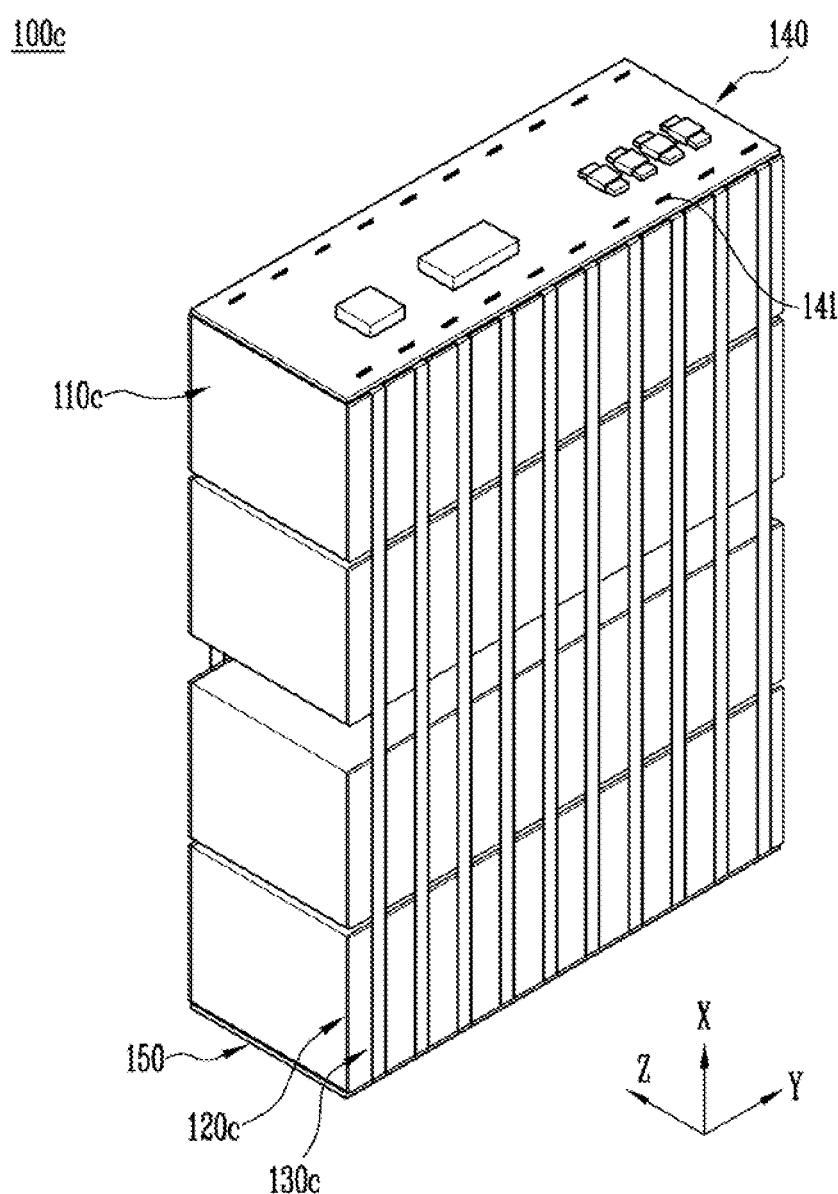
FIG. 8 illustrates a perspective view of a battery pack according to still another embodiment.
Figure 9:
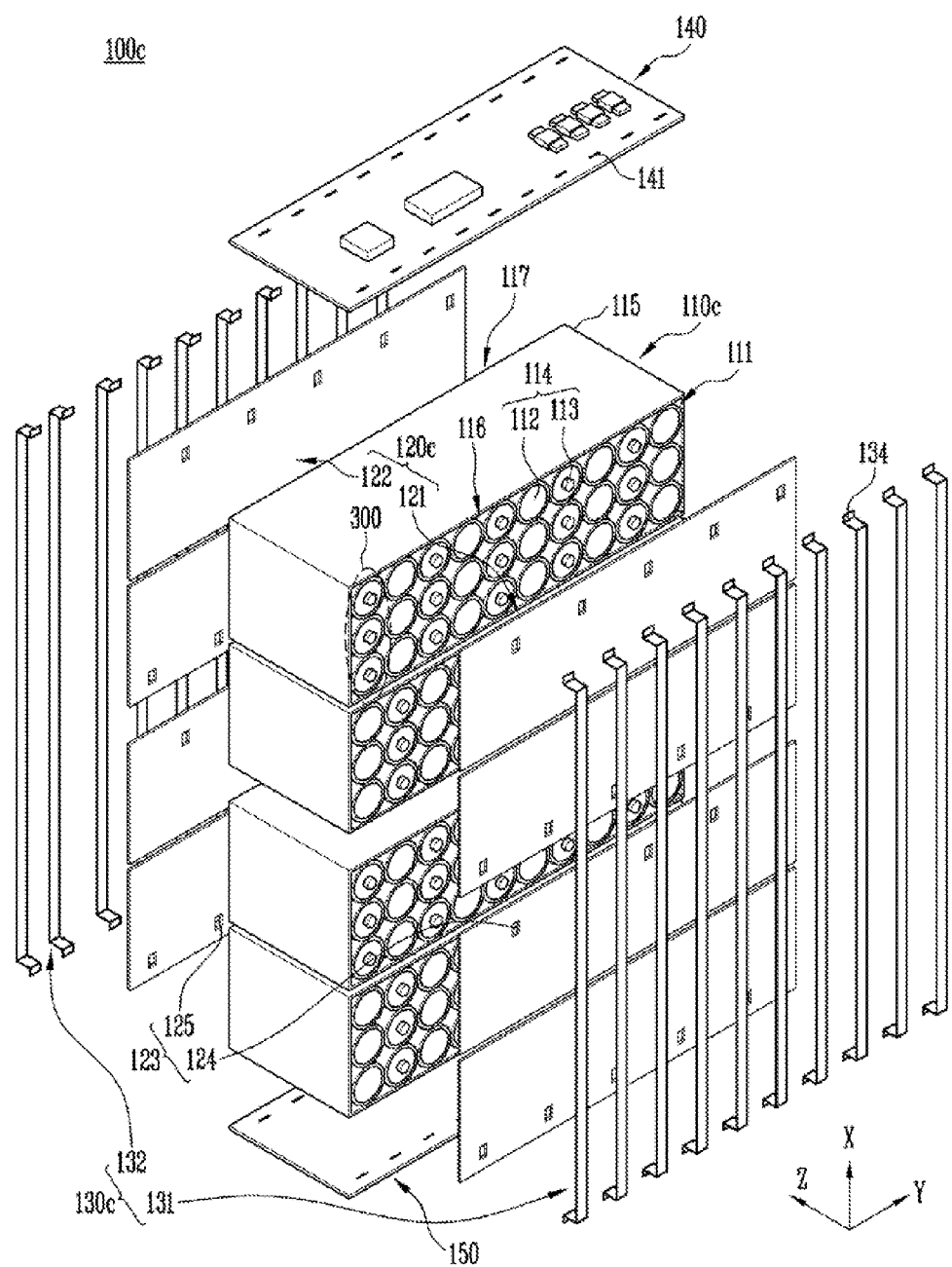
FIG. 9 illustrates an exploded perspective view of the battery pack shown in FIG. 8.

FIG. 8 illustrates a perspective view of a battery pack 100c according to still another embodiment. FIG. 9 illustrates an exploded perspective view of the battery pack 100c shown in FIG. 8. Hereinafter, the battery pack 100c according to this embodiment will be described with reference to FIGS. 8 and 9. Here, components that are identical or corresponding to those of the aforementioned embodiment are designated by like reference numerals, and repeated detailed descriptions thereof may be omitted to avoid redundancy.

As shown in FIGS. 8 and 9, the battery pack 100c according to this embodiment may include a plurality of battery arrays 110c, an insulator 120c, and a sensing bar 130c. Unit batteries 111 in the battery array 110c may be grouped together as a bundle 300. For example, the battery array 110c may include a plurality of bundles 300 aligned or arranged (e.g., repeatedly arranged) along the Y direction, and a plurality or group of unit batteries 111 that are aligned or arranged along the X direction may be included in the bundle 300. In an implementation, the plurality of bundles 300 may be arranged along the Y direction so that polarities of the terminals 114 are alternately disposed (e.g., such that the polarities of terminals 114 alternate along the Y direction), and the plurality of unit batteries 111 in each bundle 300 may be arranged along the X direction so that the polarities of the terminals 114 in the X direction (e.g., of the same bundle 300 or column) are the same. The plurality of bundles 300 may be connected together in series, and the plurality of unit batteries 111 included in each bundle 300 may be connected together in parallel. For example, any one battery array 110c of FIGS. 8 and 9 may have a 10S3P structure. When the number of unit batteries 111 in each column in one battery array 110c is increased, and the unit batteries 111 are connected in parallel, thereby constituting the bundle 300 as described above, the capacity of the entire battery array 110c may be enhanced. In this case, two battery arrays 110c may be coupled to form a battery module 200, e.g., like in the aforementioned embodiment. In this case, one battery module 200 may have a 20S3P structure.

The unit batteries 111 included in each bundle 300 may be connected in parallel, the sensing bar 130c may contact the terminal 114 of one unit battery 111 in any one bundle 300, and a state of each bundle 300 or battery array 110c may be sensed.

By way of summation and review, as the number of devices employing battery packs increases, improvement of the productivity of the battery pack has been considered. Exteriors of the devices may be diverse, and shapes of the pack may likewise be diverse. Safety of the battery pack may be basically secured. Therefore, the structure of a battery pack capable of satisfying all the desired features have been considered.

The embodiments may provide a battery pack in which a state of a battery portion or unit battery in the battery pack may be easily sensed or determined, thereby improving the safety of the battery pack.

In the battery pack according to an embodiment, the terminal of the battery portion, exposed through the opening of the insulator, may be electrically connected to the sensing bar, so that it is possible to easily sense or determine a state of the battery portion, thereby improving the safety of the battery pack.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A battery pack, comprising:
a plurality of battery arrays including a first battery array and a second battery array, each of the first and the second battery arrays including unit batteries that have terminals, the first and the second battery arrays being stacked in a first direction; wherein respective polarities of the terminals of the unit batteries of each battery array alternate along the second direction;
an insulator facing the terminals of the unit batteries of the first and second battery arrays; and
a sensing bar on the insulator, wherein:

the insulator includes at least one opening therein, at least one terminal being exposed through the at least one opening, and the sensing bar is electrically connected to the at least one terminal exposed through the at least one opening to sense a state of each of the battery arrays, and wherein the sensing bar extends in the first direction to face the terminals of the unit batteries of the first and second battery arrays being stacked in the first direction such that the sensing bar faces the at least one terminal exposed through the at least one opening and faces another terminal that is covered by the insulator.

2. The battery pack as claimed in claim 1, wherein the plurality of battery arrays are arranged so that polarities of terminals are alternately disposed.

3. The battery pack as claimed in claim 1, wherein the insulator and the sensing bar are on both sides of each of the battery arrays.

4. The battery pack as claimed in claim 3, wherein:
the insulator includes a first insulator on a first side of each of the battery arrays and a second insulator on a second side of each of the battery arrays, the second side being opposite to the first side, and the at least one opening includes a first opening in the first insulator and a second opening in the second insulator.

5. The battery pack as claimed in claim 4, wherein:
a first terminal having a first polarity is exposed through the first opening, and a second terminal having a second polarity that is opposite to the first polarity is exposed through the second opening.

6. The battery pack as claimed in claim 1, further comprising a protective circuit module that is electrically connected to the sensing bar.

7. The battery pack as claimed in claim 6, wherein:
the protective circuit module includes a first connector, the sensing bar includes a second connector at an end thereof, the second connector being coupled with first connector.

8. The battery pack as claimed in claim 7, wherein:
the first connector includes a hole or groove, and the second connector includes a projection inserted into the hole or groove of the first connector.

9. The battery pack as claimed in claim 1, wherein the sensing bar includes a protrusion that is inserted into the at least one opening to contact the at least one terminal.

10. The battery pack as claimed in claim 1, wherein the unit batteries of each battery array are arranged along a second direction that is perpendicular to the first direction.

11. The battery pack as claimed in claim 1, wherein the unit batteries are connected in series to each other.

12. The battery pack as claimed in claim 1, wherein:
each battery array includes a plurality of bundles configured to include a plurality of unit batteries, the unit batteries included in each bundle being connected to each other in parallel, and the plurality of bundles are stacked in the first direction.

13. The battery pack as claimed in claim 12, wherein polarities of the terminals of the unit batteries of the bundles alternate along the second direction.

14. The battery pack as claimed in claim 13, wherein the bundles are connected in series to each other.

15. The battery pack as claimed in claim 12, wherein the unit batteries of each bundle are aligned along the second direction.

16. The battery pack as claimed in claim 1, wherein:
adjacent battery arrays are connected in series to each other to form a plurality of battery modules, and different battery modules of the plurality of battery modules are connected in parallel to each other.

17. The battery pack as claimed in claim 1, wherein the plurality of battery arrays are accommodated in respective housings such that the plurality of battery arrays are separated from each other.

* * * * *